(12) United States Patent
Zhang et al.

(10) Patent No.: US 9,823,755 B2
(45) Date of Patent: Nov. 21, 2017

(54) METHOD AND APPARATUS FOR INTERACTIVE USER INTERFACE WITH WEARABLE DEVICE

(71) Applicant: KONICA MINOLTA LABORATORY U.S.A., INC., San Mateo, CA (US)

(72) Inventors: Yongmian Zhang, Union City, CA (US); Jingwen Zhu, Foster City, CA (US); Toshiki Ohinata, Tokyo (JP); Haisong Gu, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 372 days.

(21) Appl. No.: 14/632,661

(22) Filed: Feb. 26, 2015

(65) Prior Publication Data

US 2016/0252976 A1    Sep. 1, 2016

(51) Int. Cl.
  *G06F 3/03* (2006.01)
  *G06K 9/00* (2006.01)
  *G06F 3/01* (2006.01)
  *G06F 3/038* (2013.01)

(52) U.S. Cl.
  CPC ............ *G06F 3/0317* (2013.01); *G06F 3/011* (2013.01); *G06F 3/038* (2013.01); *G06K 9/00375* (2013.01)

(58) Field of Classification Search
  None
  See application file for complete search history.

(56) References Cited

U.S. PATENT DOCUMENTS

| | | | |
|---|---|---|---|
| 7,599,561 B2 | 10/2009 | Wilson et al. | |
| 8,139,043 B2 | 3/2012 | Hillis | |
| 2009/0213070 A1 | 8/2009 | Kalaldeh et al. | |
| 2011/0109554 A1 | 5/2011 | Boissier | |
| 2012/0162140 A1* | 6/2012 | Lee | G06F 3/0425 345/175 |
| 2013/0194312 A1* | 8/2013 | Yoshioka | G02B 21/365 345/672 |
| 2013/0229396 A1* | 9/2013 | Huebner | H04N 9/3147 345/207 |
| 2014/0232631 A1* | 8/2014 | Fleischmann | G06F 3/017 345/156 |
| 2015/0199018 A1* | 7/2015 | Kim | G06F 3/017 345/156 |

(Continued)

*Primary Examiner* — Carolyn R Edwards
*Assistant Examiner* — Bipin Gyawali
(74) *Attorney, Agent, or Firm* — Buchanan Ingersoll & Rooney PC

(57) ABSTRACT

A method and system are disclosed for recognizing an object, the method including emitting one or more arranged patterns of infrared rays (IR) from an infrared emitter towards a projection region, the one or more arranged patterns of infrared rays forming unique dot patterns; mapping the one or more arranged patterns of infrared rays on the operation region to generate a reference image; capturing an IR image and a RGB image of an object with a wearable device, the wearable device including an infrared (IR) camera and a RGB camera; extracting IR dots from the IR image and determining a match between the extracted IR dots and the reference image; determining a position of the RGB image on the reference image; and mapping the position of the RGB image to a coordinate on the projection region.

20 Claims, 12 Drawing Sheets

(56) References Cited

U.S. PATENT DOCUMENTS

2015/0229915 A1\* 8/2015 Kirk ..................... H04N 5/33
 348/51
2015/0362369 A1\* 12/2015 Page ..................... G01J 4/04
 356/364

\* cited by examiner

METHOD AND APPARATUS FOR INTERACTIVE USER INTERFACE WITH WEARABLE DEVICE

FIELD OF THE INVENTION

The present disclosure relates to a method and apparatus for an interactive user interface with a wearable device, and more particularly, to a method and apparatus for recognizing one or more fingers of a user on a projection region (or operation region) using an interactive wearable device.

BACKGROUND OF THE INVENTION

Recently users have come to demand an interactive user interface enabling them to operate the digital contents with their hands on any surface where the digital contents are displayed. Such a system can use a set of fix mounted cameras installed around the operation region for detecting the fingertips. However, the fingers can often be occluded (or obstructed) by hand pose or by other hands when multiple hands are involved in the operation. Although increasing the number of fix mounted cameras can ease this problem, this can increase the cost, computational burden and complexity of the system.

SUMMARY OF THE INVENTION

In consideration of the above issues, the hand can be better viewed in an egocentric camera because an object in an egocentric camera can be more visible. A system is disclosed, which can use a wearable device, such as an egocentric camera for detecting the hands on projection region. Unlike a static camera, with wearable cameras the fingertip position relative to the projection region is difficult to be determined due to that the camera always moves. In accordance with an exemplary embodiment, a method is disclosed, which can accurately localize the hand from a wearable camera on a projection region.

In accordance with an exemplary embodiment, a method is disclosed for recognizing an object, the method comprising: emitting one or more arranged patterns of infrared rays (IR) from an infrared emitter towards a projection region, the one or more arranged patterns of infrared rays forming a set of unique dot patterns that are gridded by an IR lattice pattern; mapping the one or more arranged patterns of infrared rays on the operation region to generate a reference image; capturing an IR image and a RGB image of an object with a wearable device, the wearable device including an infrared (IR) camera and a RGB camera, and wherein the object is located between the wearable device and the projection region; extracting IR dots from the IR image and determining a match between the extracted IR dots and the reference image; determining a position of the RGB image on the reference image; and mapping the position of the RGB image to a coordinate on the projection region.

In accordance with an exemplary embodiment, a non-transitory computer readable medium containing a computer program having computer readable code embodied to carry out a method is disclosed for recognizing an object, the method comprising: emitting one or more arranged patterns of infrared rays (IR) from an infrared emitter towards a projection region, the one or more arranged patterns of infrared rays forming unique dot patterns; mapping the one or more arranged patterns of infrared rays on the operation region to generate a reference image; capturing an IR image and a RGB image of an object with a wearable device, the wearable device including an infrared (IR) camera and a RGB camera, and wherein the object is located between the wearable device and the projection region; extracting IR dots from the IR image and determining a match between the extracted IR dots and the reference image; determining a position of the RGB image on the reference image; and mapping the position of the RGB image to a coordinate on the projection region.

In accordance with an exemplary embodiment, a system is disclosed for recognizing an object, the system comprising: an IR pattern emitter, the IR pattern emitter configured to emit one or more arranged patterns of infrared rays towards a projection region, the one or more arranged patterns of infrared rays forming unique dot patterns; and a wearable device, the wearable device including an infrared (IR) camera and a RGB camera, and wherein the object is located between the wearable device and the projection region, the wearable device configured to: extract IR dots from the IR image and find a match between the IR image and the reference image; determine a position of the RGB image on the reference image; and map the position of the RGB image to a coordinate of the projection region.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
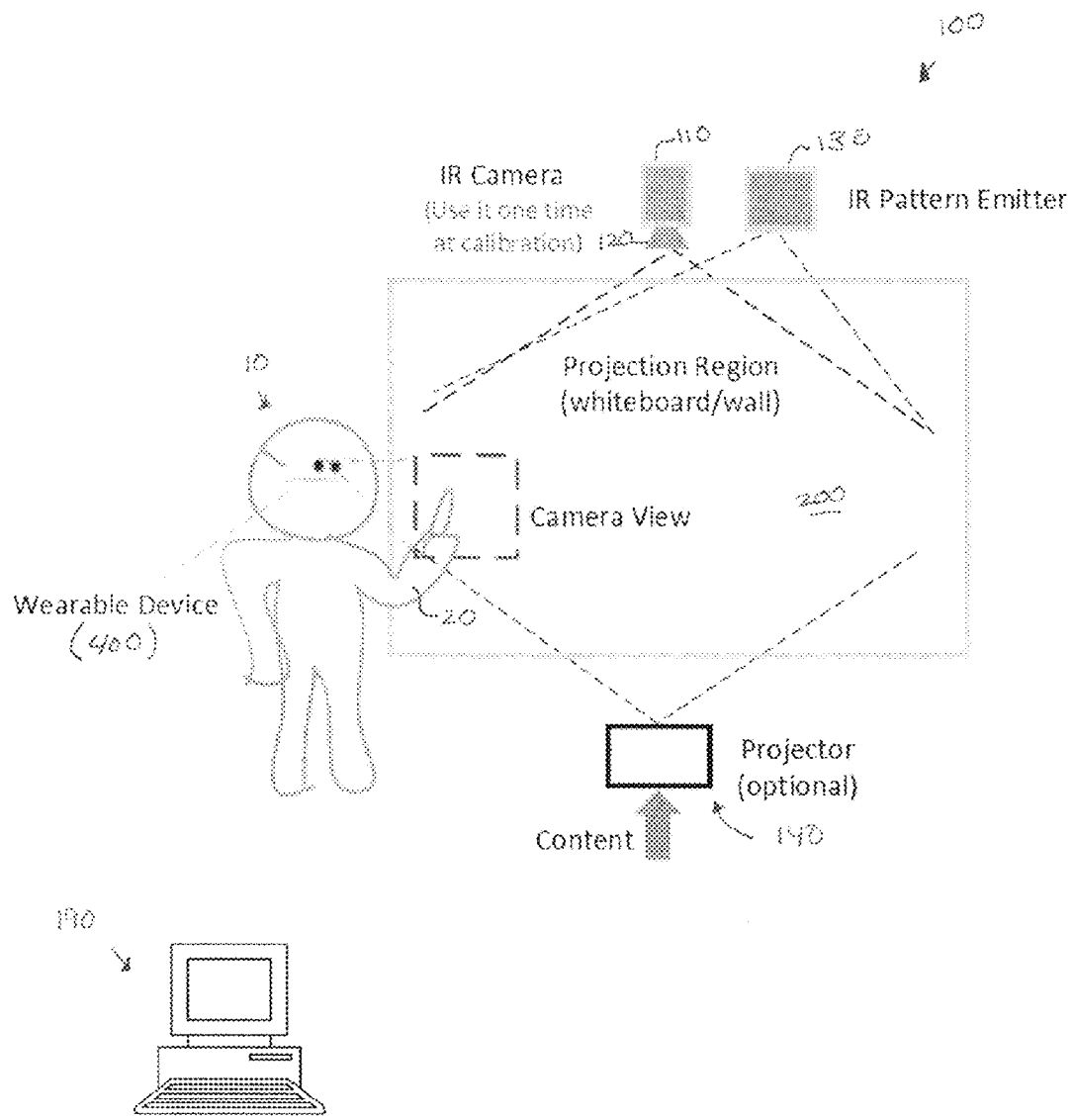
FIG. 1 is an illustration of an interactive system where a wearable device that can be used for detecting the hands on operation region in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of an interactive system 100, which includes a wearable device 400 for a user, 10, which can be used for detecting a user's hands 20 on a operation region 200 in accordance with an exemplary embodiment. In accordance with an exemplary embodiment, the system 100 consists of an infrared (IR) camera 110 with an IR pass filter 120, an IR emitter 130, and an optional projector (or optical device) 140. For example, if the operation region 200 is a LED display or similar device, which produces an image, the projector 140 may not be necessary. Alternatively, if the operation region 200 is a whiteboard and/or wall, which does not generate or produce an image, the system 100 can include a projector 140 configured to project an image and/or moving images onto the operation region 200.

In accordance with an exemplary embodiment, the infrared (IR) emitter 130 can include a laser diffractive optical element (DOE) similarly to those in an array of IR LEDs or in a Kinect® device, which is configured to cast a large number of arranged rays through a refraction mirror 150 (FIG. 2) into an arbitrary operation region 200. For example, the operation region 200 can be a surface of a table, a whiteboard, or a wall on where the projector 150 casts the contents and these rays can only be observed by the IR camera 110 through the IR pass filter 120. In accordance with an exemplary embodiment, the refraction mirror 150 can help ensure that the arranged IR rays 160 cover an entirety of the operation region 200, as shown in FIG. 2.

In accordance with an exemplary embodiment, the arranged IR rays 160 can form an IR image 170, which can include IR dots 170, vertical lines, and/or horizontal lines 172. For example, a line can be generated by a sequence of dots 170. The dots 170 and lines 172 can form an IR pattern (or image) 180 projected over the operation region 200 which are invisible to the users 10. In subsequent sections, the generation of these patterns 180 will be discussed.

Figure 2:
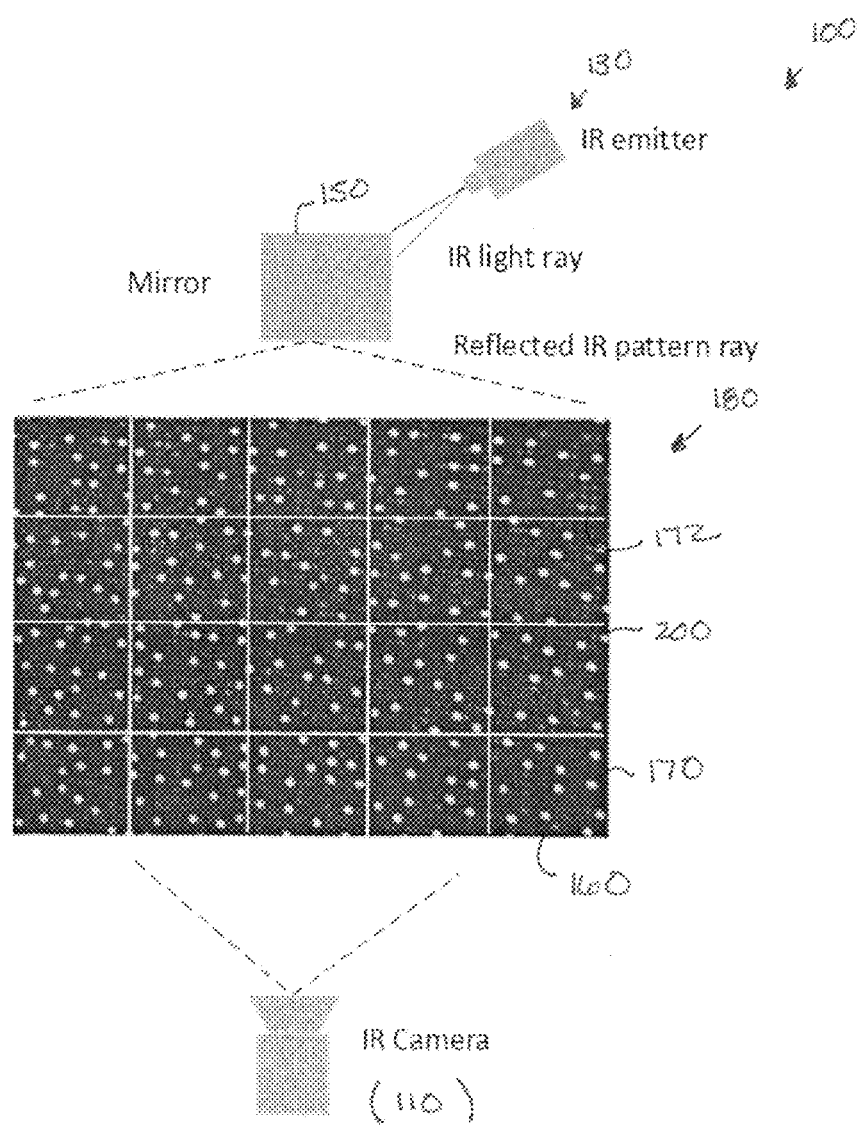
FIG. 2 is an illustration of an IR emitter, which can generate IR dots, vertical lines, and horizontal lines in accordance with an exemplary embodiment.

As shown in FIG. 2, the IR camera 110 is configured to acquire the invisible infrared rays 160 generated by the IR emitter 130 while the IR pass filter 120 is configured to increase the contrast of IR pattern or image 180. In accordance with an exemplary embodiment, the IR camera 110 can be used for generating a reference image (template) such that an image captured from the wearable device 400 matches the pattern over the reference image (template).

Figure 3:
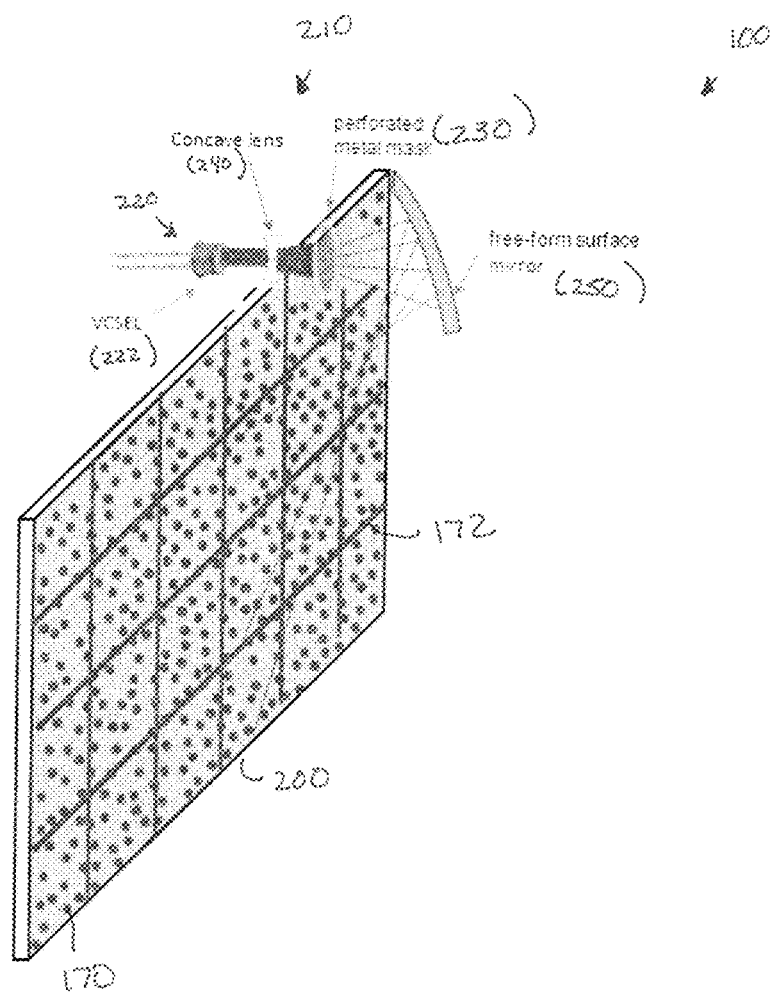
FIG. 3 is an illustration of IR dots and control lines generator in accordance with an exemplary embodiment.

In accordance with an exemplary embodiment, the IR dots 170 and the control lines 172 can be generated by a generator 210 as shown in FIG. 3. For example, the generator 210 can include a light source 220 in the form of a vertical cavity surface emitting laser (VCSEL) and a surface-emitted light source 222. In order to have a large area of emitting, for example, a perforated metal mask 230 can be used. In accordance with an exemplary embodiment, since there can be a limit of diameter and pitch of holes to generate a pattern on a metal skin, a proper VCSEL wavelength can be chosen. For example, in accordance with an exemplary embodiment, since the pulsed laser technique of perforated metal mask limits the hole diameter and pitch in 0.001 mm and in less than 0.008 mm, respectively, this is not sufficiently small to collocate patterns. Thus, a concave lens 240 can be used between the light source 220 (for example, VCSEL 222) and the mask 230 to broaden the beam dimension. For example, in accordance with an exemplary embodiment, a free-form surface mirror 250 can be used to project patterns into an area without distortion.

Figure 4:
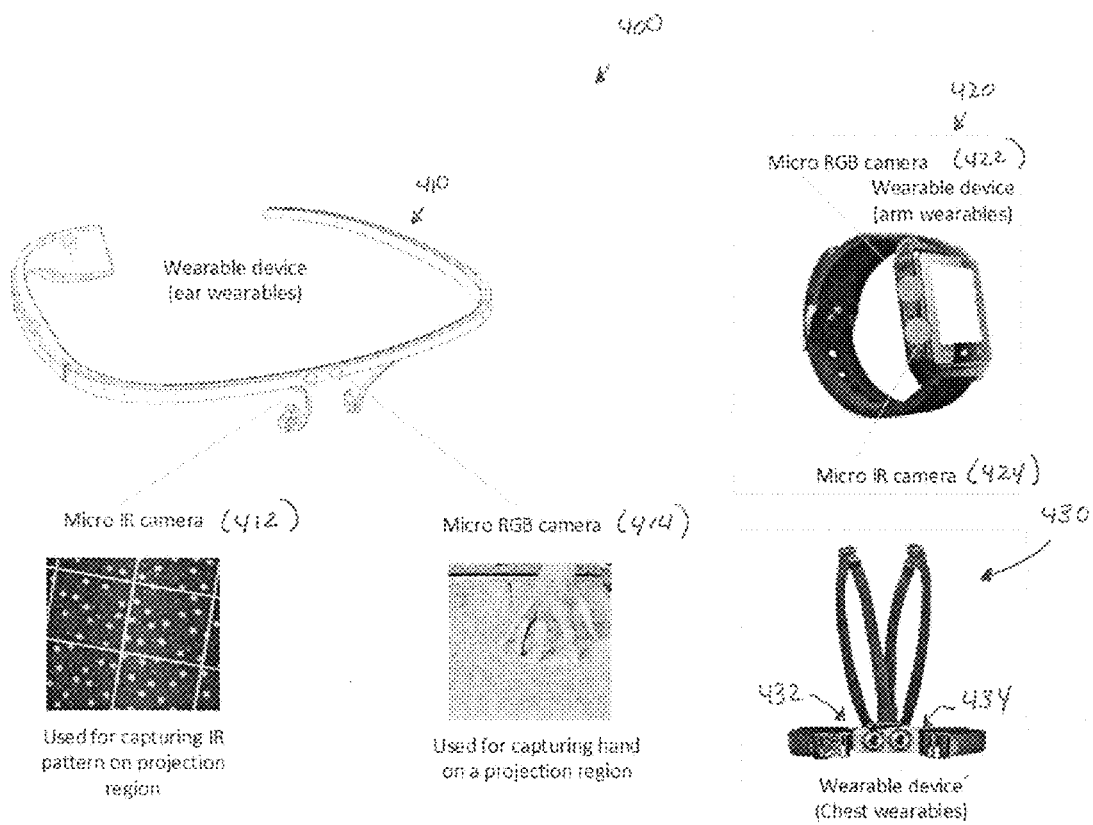
FIG. 4 are illustrations of wearable devices including an ear wearable device, a wristwatch type device, and a chest wearable device in accordance with an exemplary embodiment.

In accordance with an exemplary embodiment, the wearable devices 400 can be, for example, ear wearables (glasses-like) 410, arm wearables 420, or chest wearables 430 as shown in FIG. 4. For example, the ear wearable device 410 can include a micro IR camera 412, which can be used to capture IR patterns on the operation region 200, and a micro RGB camera 414, which can be used to capture images, for example, hand images, on the operation region 200.

In accordance with an exemplary embodiment, the system 100 can be configured with an arm wearable device 420 to help ensure that the hand wearing the device can be detected at any time. In accordance with an exemplary embodiment, the wearable device 420 can be composed of two micro-cameras 422, 424, for example, one is a micro IR camera 422 and another micro RGB camera 424. The micro IR camera 422 can be configured to capture the IR patterns 180 (dots 170 and lines 172) on the operation region 200 while the micro RGB camera 424 can be configured to capture the egocentric video of a hand movement for detecting the fingertips of the hand, as illustrated in FIG. 3. In accordance with an exemplary embodiment, the two cameras are preferably aligned during the manufacturing process.

In accordance with an exemplary embodiment, a processor (for example, a micro-processor (not shown) can be embedded in the wearable device 400 to preprocess each image captured by the wearable device 400. During the preprocessing, the RGB image can be sent to the micro-processor for the detection, for example, of the position of the hand and/or fingertips. At the same time, the IR image can be sent to a computer 190 via, for example, a wireless signal. The computer 190 can include a memory, a processor, an operating system (OS), and an optional graphical user interface (GUI). The computer can be configured to receive the IR image and can form, for example, a Delaunay triangulation and matching pattern on the reference image. In accordance with an exemplary embodiment, the hand and/or fingertip position can then be sent to the computer and combined with the IR pattern 180 to identify and/or locate a relative position of the hand and/or fingertip on the operation region 200.

Figure 5A:
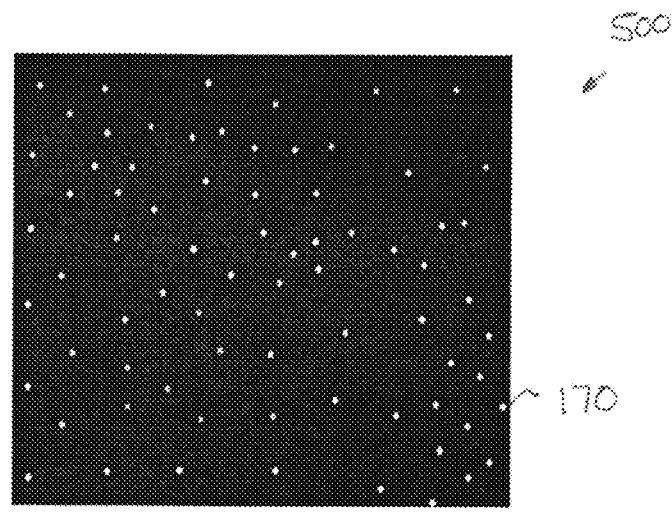
FIG. 5A is an illustration of unique dots pattern, which can be generated by using a machine program in accordance with an exemplary embodiment.
Figure 5B:
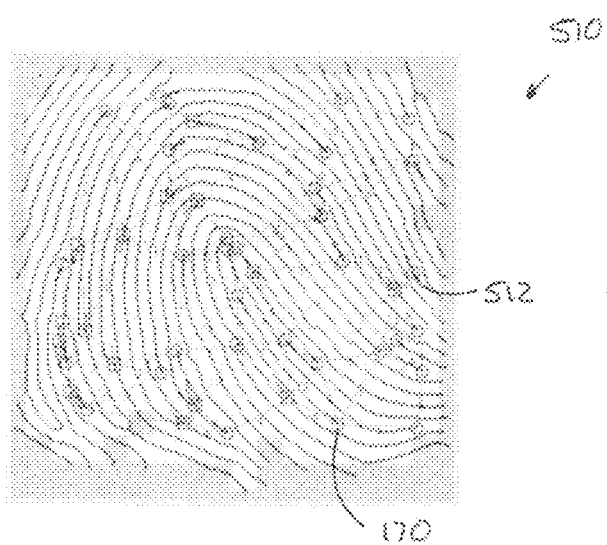
FIG. 5B is an illustration showing the use of a set of minutiae points minutiae points extracted from a fingerprint, and wherein a Delaunay triangulation nets are also plotted in accordance with an exemplary embodiment.

In accordance with an exemplary embodiment, the generated dots 170 can be sparsely distributed over the operation region 200 so that each of the dots 170 can be easily detected by using a relatively simple image processing technology, such that less computational power is used. In addition, more importantly, using these patterns, the hand image from the wearable device 400 can be easily and precisely localized on the operation region 200, which can require that the pattern shall be unique in a sufficiently small local area of the operation region 200. In accordance with an exemplary embodiment, the scattered dots 170 in the form of the IR pattern 510 can be generated by a machine program, for example, as shown in FIG. 5A. Alternatively, in accordance with an exemplary embodiment, a set of minutiae points 512 extracted from a fingerprint 510, for example, can be regarded as scattered points on the plane, as shown in FIG. 5B.

In accordance with an exemplary embodiment, Delaunay triangulation can be used as an effective tool in dealing with scattered data set. For example, the net produced by the Delaunay triangulation can provide good performance in terms of the uniqueness and good local stability. In accordance with an exemplary embodiment, the triangulation net of scattered points on the plane has three characteristics, which can be described as follows: (a) Delaunay triangulation net is unique if the scattered point is non-degenerate, which can help guarantee a minutiae set, which can always obtain the same triangulation net; (b) Delaunay triangulation net has very good local stability, which can help guarantees that triangulation nets of fingerprints generated from the same finger are basically same; and (c) Delaunay triangulation algorithm of 2D data points has a linear time complexity which makes the algorithm suitable for an on-line system. In accordance with an exemplary embodiment, for example, because of these properties, a set of minutiae points of a fingerprint can be used as IR dots pattern for a small local area (cell) of the project region.

Figure 6:
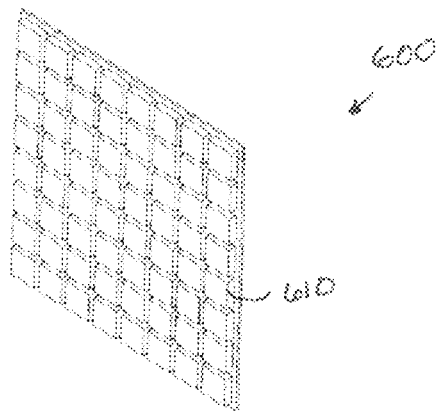
FIG. 6 is an illustration of gridding a projector image into a set of cells to form an IR lattice pattern in accordance with an exemplary embodiment.
Figure 7:
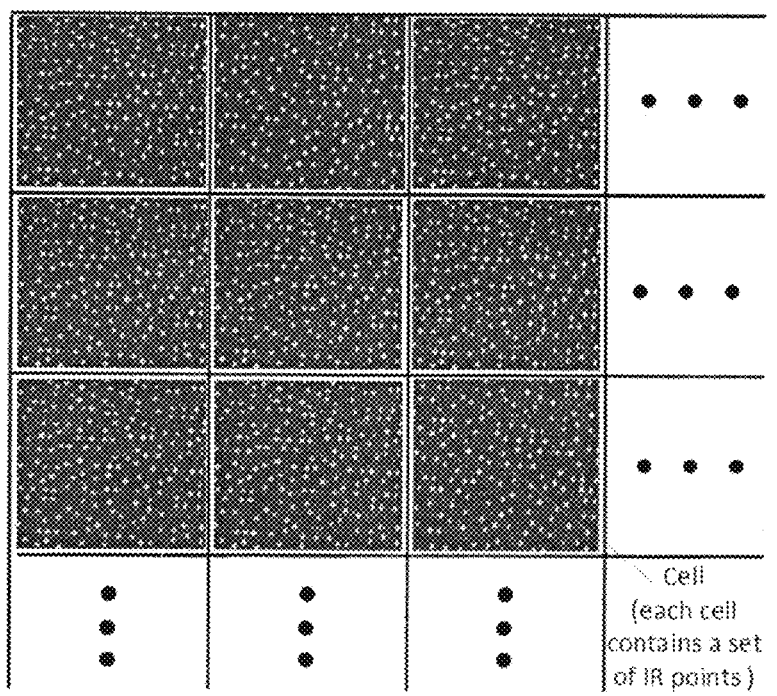
FIG. 7 is illustration showing that each cell contains a unique set of minutiae points, and wherein the points and cell boundary lines are the IR rays in accordance with an exemplary embodiment.
Figure 8:
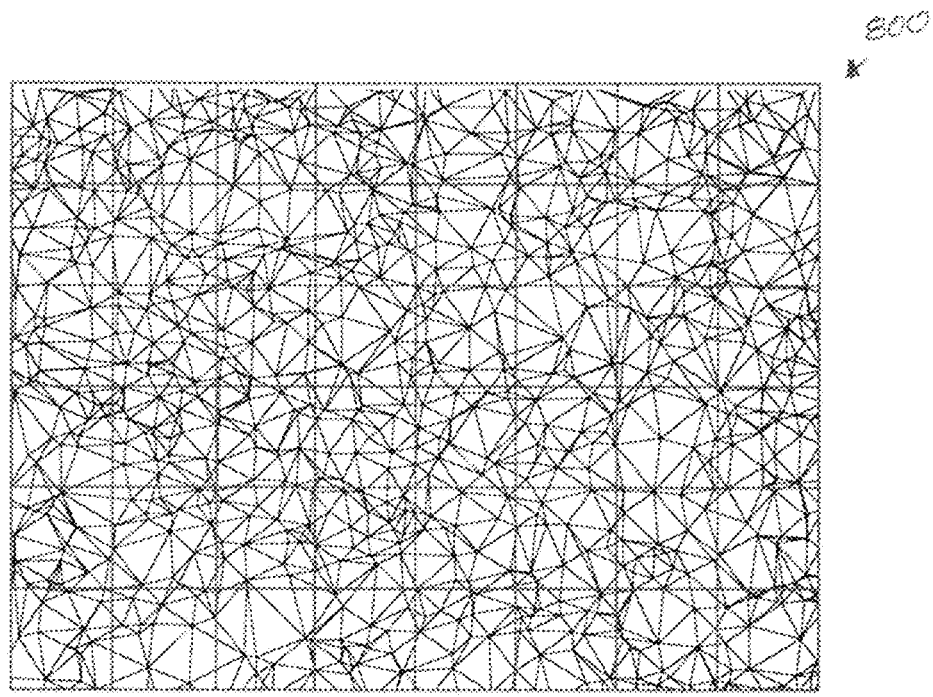
FIG. 8 is an illustration showing that the triangulation nets formed from IR dots as shown in FIG. 7 in accordance with an exemplary embodiment.

In accordance with an exemplary embodiment, a projector buffer image grid 600 can be placed into a set of cells 610 as illustrated in FIG. 6. Each cell 610 is then filled with a unique set of point patterns, for example, a set of minutiae points extracted from a fingerprint as shown in FIG. 7. As disclosed above, the dots and cell boundary lines can then be generated by using an array of IR LEDs (light emitting diodes). Once the IR dots 170 and the boundary lines 172 of the cells are detected, a plurality of Delaunay triangulation nets 800 can be formed as illustrated in FIG. 8.

Figure 9:
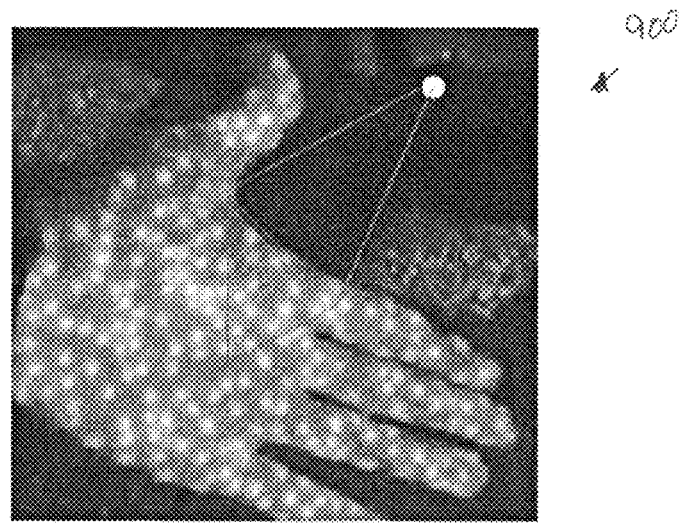
FIG. 9 is an illustration of a hand blocking the IR arranged rays, which can distort the triangulation nets in accordance with an exemplary embodiment.

In accordance with an exemplary embodiment, for example, when a hand and/or finger tips of a user 20 moves on the surface of the operation region 200, the hand and/or fingertips 900 will block the IR rays as illustrated in FIG. 9. However, the wearable device 400 can move as the hand moves. Accordingly, the camera view angle of a wearable device 400 can change, which can cause a distortion of the plurality of Delaunay triangulation nets 800. In accordance with an exemplary embodiment, this will not significantly affect the match performance since the triangulation net has a very good local stability.

Figure 10:
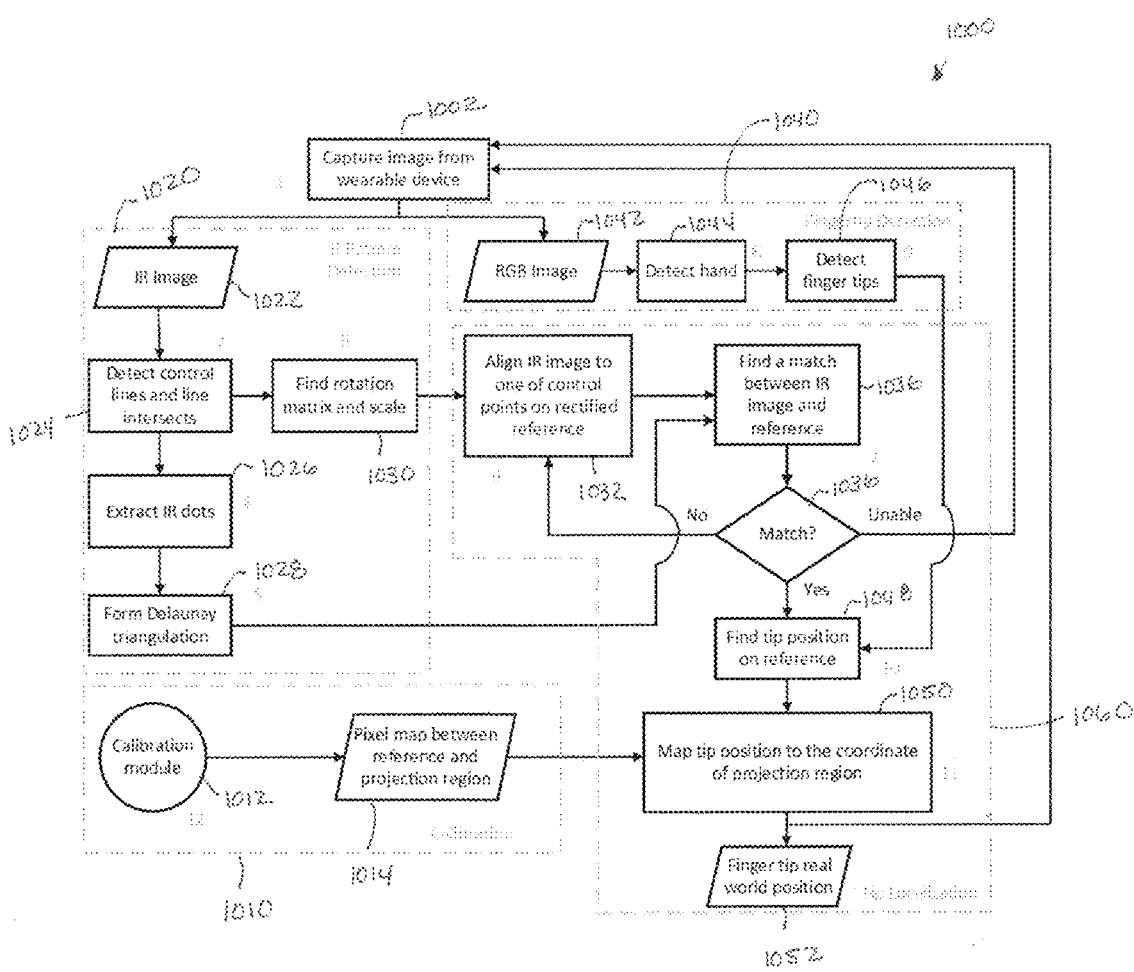
FIG. 10 is an illustration showing a diagram of the system in accordance with an exemplary embodiment.

FIG. 10 is a block diagram showing the process in accordance with an exemplary embodiment. As shown in FIG. 10, the system 1000 can include a calibration module 1010, an IR pattern detection module 1020, a fingertip detection module 1040, and a tip localization module 1060.

In accordance with an exemplary embodiment, calibration of the system is configured to find a correspondence between the reference IR image (with IR patterns) and the operation region 200. In accordance with an exemplary embodiment, calibration can be a one-time process during system installation. In accordance with an exemplary embodiment, the calibration module 1010 includes a calibration module 1012, which is configured to generate a pixel map 1014 between a reference and the projection region. The generated pixel map 1014 can then be fed into the fingertip detection module 1040.

The IR pattern detection module 1020 is configured to identify dots and control lines captured by the micro IR camera on the wearable device 400. Since the image rotation and scale relative to the reference image is known, the Delaunay triangulation can be formed according to the detected dots. For example, in accordance with an exemplary embodiment as shown in FIG. 10, in step 1002, the image can be captured by the wearable device 400, which produces an IR image 1022 and a RGB image 1042. In step 1024, the IR image 1022 can be processed to detect control lines and line intersects. In step 1026, the IR dots 170 are extracted from the IR image. In step 1028, a Delaunay triangulation is formed, which is forwarded to step 1034. In step 1030, the rotation matrix and scaling of the IR image is found and in step 1032, the IR image is aligned to one of the control points on a rectified reference. The aligned IR image is then fed to step 1034, where it is determined if a match can be found between the IR image and the rectified reference. In step 1036, if no match between the aligned IR image and the Delaunay triangulation can be found, the process returns to step 1032 where the IR image is realigned to one of the control points on the rectified reference. In step 1036, if the IR image cannot be aligned after one or more attempts, the process returns to step 1002, where another image is captured from the wearable device. If a match is found in step 1036, the process continues to step 1048.

In accordance with an exemplary embodiment, the fingertip detection module 1040 is configured to identify (or find) a fingertip position on the image from the wearable device 400. In accordance with an exemplary embodiment, finger localization is once a fingertip presents and is detected on the image from the wearable device 400. In accordance with an exemplary embodiment, the tip position in the real world coordinate can be known through the calibration parameters. As shown in FIG. 10, in step 1044, the RGB image captured is processed via a processor to detect the hand, and in step 1046, the fingertips are detected. In step 1048, the detected fingertips from step 1046 and the match between the IR image and reference in step 1036 are then used to determine a position of the fingertip within the reference. In step 1050, the position of the fingertip is mapped to a coordinate within the operation region 200. In step 1052, a determination of the position (or real world coordinate) of the fingertip can be determined based on the pixel mapping in step 1050.

Figure 11:
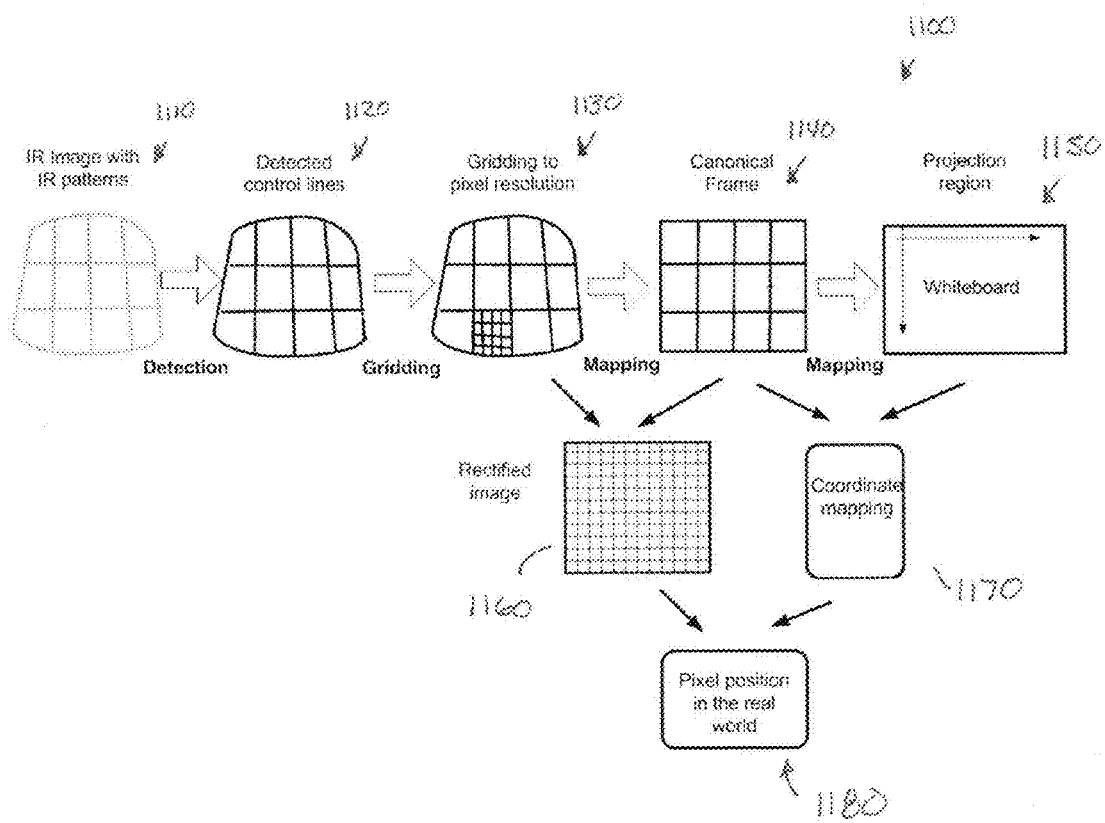
FIG. 11 is an illustration showing a diagram for calibration between the reference image and the operation region in accordance with an exemplary embodiment.

In accordance with an exemplary embodiment, calibration can be used to determine the corresponding or relative positions between the coordinates of the IR image and the real world coordinate of the operation region 200. FIG. 11 is an illustration showing the process diagram of calibration 1100. The IR image from a camera can generally be distorted and the image then needs to be rectified. Accordingly, the image can be rectified by gridding each cell to a pixel level resolution and then mapping the pixels to a canonical frame. First, in step 1110, an IR image is captured about the project region casted with IR dot patterns and control lines. In step 1120, the control lines are detected. In step 1130, a gridding of the IR image is performed to pixel resolution. In step 1140, a conical frame is generated, which is then mapped onto the operation region in step 1150. In addition, in step 1160, a rectified image can be produced and in combination with step 1170, which includes a coordinate mapping, the pixel position in the real world can be determined in step 1180.

Figure 12:
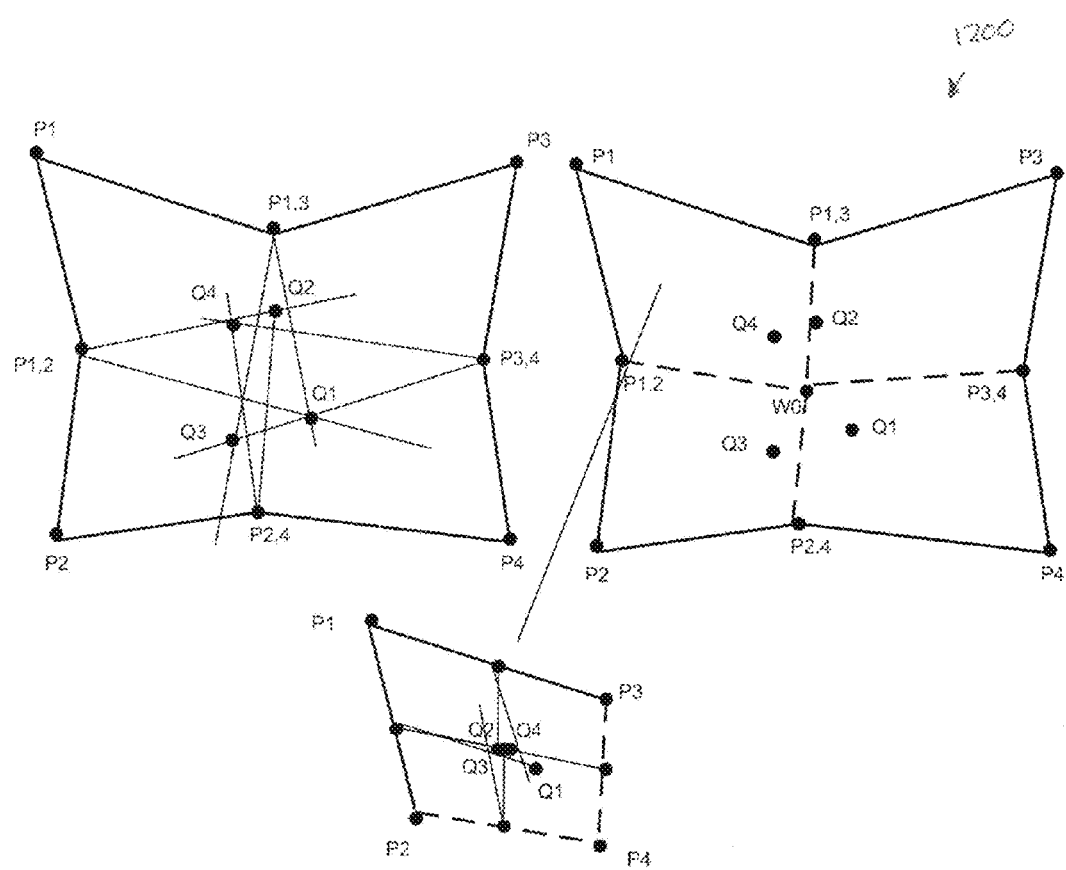
FIG. 12 is an illustration showing a subdivision grid of a distorted cell in accordance with an exemplary embodiment.

In accordance with an exemplary embodiment, the calibration algorithm can include a method of detecting control lines in the IR reference image, which can be the same as the detection of the control line in the IR image from a wearable device 400, as disclosed herein. After the control lines are detected, each of the cells of the image can be extracted. For example, assuming a distorted cell 1200 with 4 corners, $P_1$, $P_2$, $P_3$, $P_4$, where P=(x, y), as shown in FIG. 12, the middle point can be found for each edge of the cell as $P_{1,2}$, $P_{1,3}$, $P_{2,3}$, $P_{3,4}$, respectively. These points can then be used to form four parallelograms with a new corner point, $Q_1$, $Q_2$, $Q_3$, $Q_4$, respectively, where Q=(x,y). In accordance with an exemplary embodiment, the new corners can be calculated as $$Q_1 = P_1 + 2\left(\frac{P_{1,2}+P_{1,3}}{2} - P_1\right) = P_{1,2} + P_{1,3} - P_1 \quad (1)$$

$$Q_3 = P_3 - 2\left(P_3 - \frac{P_{1,3}+P_{3,4}}{2}\right) = P_{1,3} + P_{3,4} - P_3 \quad (2)$$

Following the above equations, $Q_2$ and $Q_4$ can be obtained. The center of new corners $W_0$, which can be calculated by the following equation (Equation 3), is the pixel in which the canonical frame is mapped. $W_0$ and the middle points $P_{1,2}$, $P_{1,3}$, $P_{2,3}$, $P_{3,4}$ form new cells. In accordance with an exemplary embodiment, the gridding process can be repeated k times until the resolution of the gridded cell is sufficiently small. As a result, the correspondence between the distorted reference image and a canonical frame can be established. Thus, the correspondence between the distorted reference image and the operation region can also be known through the mapping between the canonical frame and the projection region.

$$W_0 = \frac{Q_1 + Q_2 + Q_3 + Q_4}{4} = \quad (3)$$
$$\frac{1}{2}(P_{1,2} + P_{1,3} + P_{3,4} + P_{2,4}) - \frac{1}{4}(P_1 + P_2 + P_3 + P_4)$$

Because the pixels of IR dot and control lines are brighter than any other pixels, a simple thresholding method can be used to detect the pixels of IR dots and control lines. Then, connected component analysis can be used for determining whether the pixel belongs to dots or lines. The dot position is the mass center of the connected component. Then, a Hough transform can be applied to determine lines and line intersects (control points).

Figure 13:
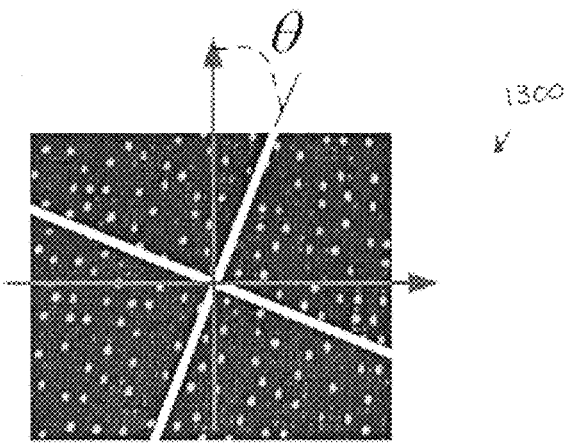
FIG. 13 is an illustration showing an IR image from a wearable device, which contains IR dots and IR control lines in accordance with an exemplary embodiment.

Based on the slope of a line, the image rotation as shown in FIG. 13 can be known so that image can be transformed to the reference image based on Equation 4 as disclosed below.

In accordance with an exemplary embodiment, for example, the image scaling factor between the input image from wearable device and the reference image can be determined by the thickness of the detected line. In addition, based on the detected dots, a Delaunay triangulation net can be formed.

FIG. 13 is an illustration of an IR image 1300 from the wearable device 400 containing IR dots and IR control lines in accordance with an exemplary embodiment.

Figure 14:
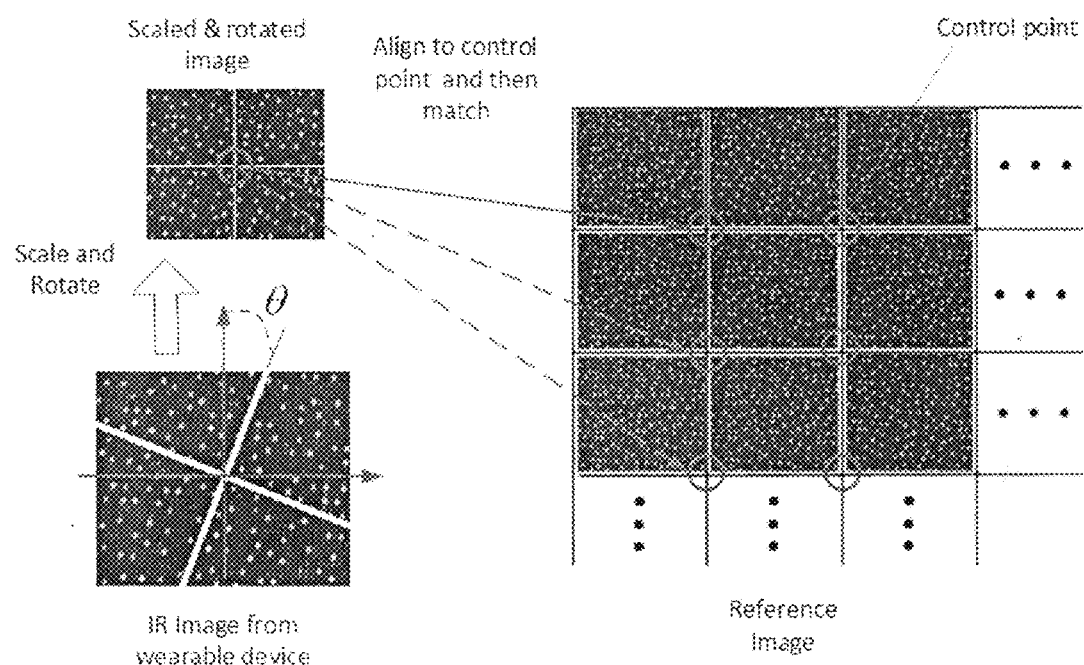
FIG. 14 is an illustration showing how the IR image matches the IR reference image in accordance with an exemplary embodiment.

In accordance with an exemplary embodiment, fingerprint identification can be used to determine whether two fingerprints are from the same finger or not. In order to determine this, the input image needs to be aligned with the reference image represented by its dot pattern. In accordance with an exemplary embodiment, the following rigid transformation can be performed:

$$\begin{bmatrix} x^r \\ y^r \end{bmatrix} = s \begin{bmatrix} \cos\theta\sin\theta \\ -\sin\theta\cos\theta \end{bmatrix} \begin{bmatrix} x^i \\ y^i \end{bmatrix} + \begin{bmatrix} \Delta x \\ \Delta y \end{bmatrix} \quad (4)$$

where (s, θ, Δx, Δy) represent a set of rigid transformation parameters: (scale, rotation, translation). Under a simple affine transformation, a point can be transformed to its corresponding point after rotation θ and translation (Δx, Δy). How to obtain s, θ is explained above. (Δx, Δy) is the position of the control point on the reference image. After the image is rotated and scaled, the best resemblance can be found between the input IR image from wearable device and the IR reference image by aligning the control point in the IR image over all control points in the IR reference image and then calculating the similarity between two triangulation nets 1400, as illustrated in FIG. 14. The Delaunay triangulation match process diagram 1500 is presented in FIG. 15.

Figure 15:
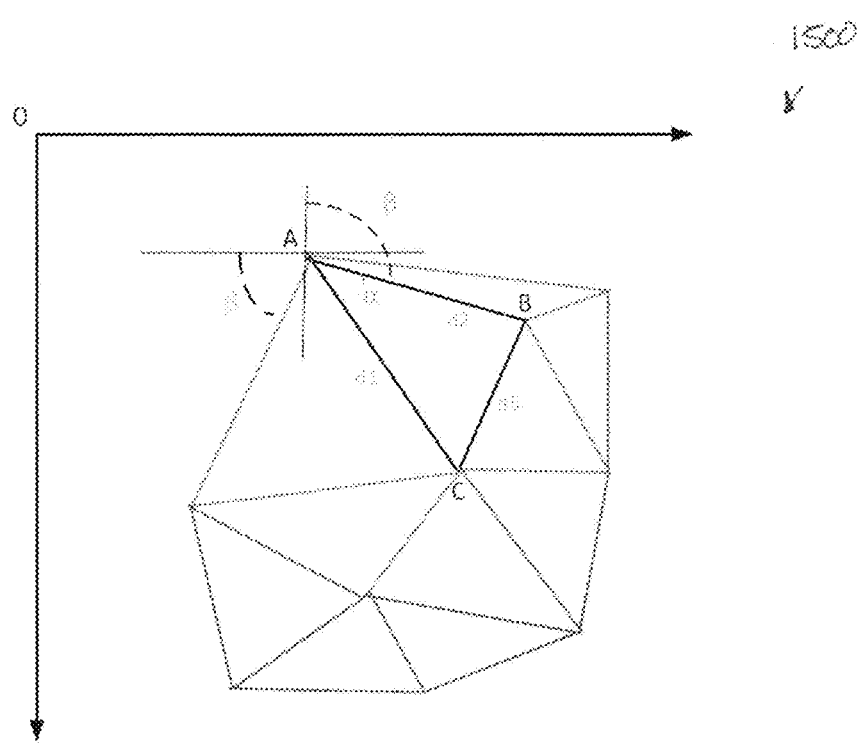
FIG. 15 is an illustration showing Delaunay triangles in a triangulation net in accordance with an exemplary embodiment.

The feature vector of a Delaunay triangle ABC as shown in FIG. 15 can be defined as $$f=\{d_1, d_2, d_3, \alpha_{12}, \alpha_{13}, \alpha_{23}\},$$

where d denotes the length of the triangle edge and α is the angle of two edges. The edges from other neighboring triangle(s) connected with a vertex of the triangle are called the tails of the vertex (blue edges in FIG. 15). Each tail has an orientation angle relative to its vertex, denoted as β. The image-level similarity can be constructed from Delaunay triangle-level similarities. If the difference between two triangles falls within some tolerance by comparing triangle feature and tail orientations of each triangle vertex, they are matched. After local matching procedure is performed, the numbers of matched triangles can be obtained. The degree of similarity between two images can be measured by $$\text{score} = \frac{2m \times 100}{p + q}$$

where m is the number of matched triangles; p and q are the number of triangles in the input image and the reference image, respectively.

In accordance with an exemplary embodiment, the method can include the following:

1. Rotate and scale input image
2. Translate the input image to the first control point on the reference image
3. Get the boundary of interest on the reference image according to the size of the input image
4. Set match count S = 0
5. Make a list I containing triangles and tails of each triangle from input image
6. Make a list R containing triangles and tails of each triangle from reference image
7. Select the first triangle X from I
8. Find a nearest triangle Y from R by comparing the position of triangle vertices
9. Compare the feature vector f between X and Y -continued

```
    10. If matches within some tolerance
    11.     Compare the orientation β of all tails associated with each
vertex of X to that of corresponding vertex of Y
    12.         If matches within some tolerance
    13.             Increase match count S
    14.         Endif
    15. Endif
    16. Remove X and Y from I and R, respectively
    17.     Go to 7
    18. If S is greater than the previous S, this control point is currently
the best match
    19.     Translate the input image to the next control point on the
reference image
    20. Go to 3
    21. Return the control point on the reference image with the best match
```

In accordance with an exemplary embodiment, a non-transitory computer readable medium is disclosed containing a computer program having computer readable code embodied to carry out a method for recognizing an object, the method comprising: emitting one or more arranged patterns of infrared rays (IR) from an infrared emitter towards a projection region, the one or more arranged patterns of infrared rays forming unique dot patterns; mapping the one or more arranged patterns of infrared rays on the operation region to generate a reference image; capturing an IR image and a RGB image of an object with a wearable device, the wearable device including an infrared (IR) camera and a RGB camera, and wherein the object is located between the wearable device and the projection region; extracting IR dots from the IR image to determine a match between the extracted IR dots and the reference image; determining a position of the RGB image on the reference image; and mapping the position of the RGB image to a coordinate on the projection region.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for recognizing an object, the method comprising:
    emitting one or more arranged patterns of infrared rays (IR) from an infrared emitter towards a projection region, the one or more arranged patterns of infrared rays forming a set of unique dot patterns that are gridded by an IR lattice pattern;
    mapping the one or more arranged patterns of infrared rays on the operation region to generate a reference image;
    capturing an IR image and a RGB image of an object with a wearable device, the wearable device including an infrared (IR) camera and a RGB camera, and wherein the object is located between the wearable device and the projection region;
    extracting IR dots from the IR image and determining a match between the extracted IR dots and the reference image;
    determining a position of the RGB image on the reference image;
    mapping the position of the RGB image to a coordinate on the projection region;
    rectifying the captured IR image by gridding each cell to a pixel level resolution and mapping pixels to a canonical frame;
    detecting control lines in the IR reference image, and extracting a plurality of cells from the IR reference image;
    determining a middle point for each edge of the plurality of cells and using the middle points to form four parallelograms, each of the four parallelograms having a new corner point;
    determining a new middle point from the new corner points; and
    forming new cells with the new middle point and the middle point for each edge of the plurality of cells.

2. The method of claim 1, comprising:
    aligning the captured IR image to a rectified reference; and
    finding a match between the rectified reference and the reference image by applying a Delaunay triangulation to the extracted IR dots.

3. A method for recognizing an object, the method comprising:
    emitting one or more arranged patterns of infrared rays (IR) from an infrared emitter towards a projection region, the one or more arranged patterns of infrared rays forming a set of unique dot patterns that are gridded by an IR lattice pattern;
    mapping the one or more arranged patterns of infrared rays on the operation region to generate a reference image;
    capturing an IR image and a RGB image of an object with a wearable device, the wearable device including an infrared (IR) camera and a RGB camera, and wherein the object is located between the wearable device and the projection region;
    extracting IR dots from the IR image and determining a match between the extracted IR dots and the reference image;
    determining a position of the RGB image on the reference image;
    mapping the position of the RGB image to a coordinate on the projection region;
    detecting pixels of the IR dots and control lines using a thresholding method;
    determining whether the pixels belong to dots or lines using connected component analysis; and
    applying a Hough transform to identify lines and lines intersects.

4. The method of claim 1, comprising:
    performing a fingertip identification, the fingertip identification including aligning the input image with the reference image represented by the dot pattern of the input image by a rigid transformation.

5. The method of claim 1, comprising:
aligning the IR image to control points on a rectified reference by detecting the control lines and the line intersects.

6. The method of claim 1, comprising:
generating the one or more arranged patterns of infrared rays using a machine program.

7. The method of claim 1, comprising:
generating the one or more arranged patterns of infrared rays using a set of minutiae points extracted from one or more fingerprints.

8. The method of claim 1, comprising:
using an IR camera having an IR pass filter to map the one or more arranged patterns of infrared rays on the operation region to generate the reference image.

9. The method of claim 1, comprising:
preprocessing the RGB image on the wearable device; and
sending the preprocess RGB image and the IR image to a computer for the steps extracting the IR dots from the IR image to the extracted IR dots to determine a match between the IR image and the reference image, determining the position of the RGB image on the reference image, and mapping the position of the RGB image to the coordinate of the projection region.

10. The method of claim 1, wherein the first object is a hand and/or one or more fingertips of a user.

11. A non-transitory computer readable medium containing a computer program having computer readable code embodied to carry out a method for recognizing an object, the method comprising:
emitting one or more arranged patterns of infrared rays (IR) from an infrared emitter towards a projection region, the one or more arranged patterns of infrared rays forming unique dot patterns;
mapping the one or more arranged patterns of infrared rays on the operation region to generate a reference image;
capturing an IR image and a RGB image of an object with a wearable device, the wearable device including an infrared (IR) camera and a RGB camera, and wherein the object is located between the wearable device and the projection region;
extracting IR dots from the IR image and determining a match between the extracted IR dots and the reference image;
determining a position of the RGB image on the reference image;
mapping the position of the RGB image to a coordinate on the projection region;
rectifying the captured IR image by gridding each cell to a pixel level resolution and mapping pixels to a canonical frame;
detecting control lines in the IR reference image, and extracting a plurality of cells from the IR reference image;
determining a middle point for each edge of the plurality of cells and using the middle points to form four parallelograms, each of the four parallelograms having a new corner point;
determining a new middle point from the new corner points; and
forming new cells with the new middle point and the middle point for each edge of the plurality of cells.

12. The non-transitory computer readable medium of claim 11, further comprising:
aligning the captured IR image to a rectified reference; and
finding a match between the rectified reference and the reference image by applying a Delaunay triangulation to the extracted IR dots.

13. The non-transitory computer readable medium of claim 11, comprising:
detecting pixels of the IR dots and control lines using a thresholding method;
determining whether the pixels belong to dots or lines using connected component analysis;
applying a Hough transform to identify lines and lines intersects; and
performing a fingertip identification, the fingertip identification including aligning the input image with the reference image represented by the dot pattern of the input image by a rigid transformation.

14. A system for recognizing an object, the system comprising:
an IR pattern emitter, the IR pattern emitter configured to emit one or more arranged patterns of infrared rays towards a projection region, the one or more arranged patterns of infrared rays forming unique dot patterns; and
a wearable device, the wearable device including an infrared (IR) camera and a RGB camera, and wherein the object is located between the wearable device and the projection region, the wearable device having a processor configured to:
extract IR dots from an IR image and find a match between the IR image and the reference image;
determine a position of a RGB image on the reference image;
map the position of the RGB image to a coordinate of the projection region;
rectify the IR image by gridding each cell to a pixel level resolution and mapping pixels to a canonical frame;
detect control lines in the IR reference image, and extract a plurality of cells from the IR reference image;
determine a middle point for each edge of the plurality of cells and use the middle points to form four parallelograms, each of the four parallelograms having a new corner point;
determine a new middle point from the new corner points; and
form new cells with the new middle point and the middle point for each edge of the plurality of cells.

15. The system of claim 14, wherein the wearable device is an ear wearable, an arm wearable, and/or a chest wearable.

16. The system of claim 14, comprising:
a projector for projecting an image onto the projection region.

17. The system of claim 14, wherein the IR pattern emitter is a laser diffractive optical element.

18. The system of claim 14, comprising:
a refraction mirror configured to cast the one or more arranged patterns of infrared rays towards an entirely of the projection region.

19. The system of claim 14, wherein the processor of the wearable device is configured to:
align the IR image to a rectified reference; and
find a match between the rectified reference and the reference image by applying a Delaunay triangulation to the extracted IR dots.

20. The system of claim 14, wherein the processor of the wearable device is configured to:
- detect pixels of the IR dots and control lines using a thresholding method;
- determine whether the pixels belong to dots or lines using connected component analysis; and
- apply a Hough transform to identify lines and lines intersects.

* * * * *